United States Patent
Franck et al.

(10) Patent No.: US 9,987,832 B2
(45) Date of Patent: Jun. 5, 2018

(54) HONEYCOMB SANDWICH PANEL PAINT READY SURFACE

(71) Applicant: B/E Aerospace, Inc., Wellington, FL (US)

(72) Inventors: George T. Franck, Santa Ana, CA (US); Alvin S. Bartolome, Eastvale, CA (US); Patrick G. Jarvis-Shean, Fullerton, CA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 144 days.

(21) Appl. No.: 14/631,790

(22) Filed: Feb. 25, 2015

(65) Prior Publication Data

US 2015/0239226 A1 Aug. 27, 2015

Related U.S. Application Data

(60) Provisional application No. 61/945,330, filed on Feb. 27, 2014.

(51) Int. Cl.
*B32B 37/06* (2006.01)
*B32B 38/00* (2006.01)
(Continued)

(52) U.S. Cl.
CPC .......... *B32B 38/0012* (2013.01); *B29C 35/02* (2013.01); *B29C 37/0075* (2013.01); *B29D 99/0089* (2013.01); *B32B 9/007* (2013.01); *B32B 17/067* (2013.01); *B32B 27/06* (2013.01); *B32B 27/28* (2013.01); *B32B 27/30* (2013.01); *B32B 27/34* (2013.01); *B32B 27/36* (2013.01); *B32B 27/38* (2013.01); *B32B 37/182* (2013.01); *B29C 37/0064* (2013.01); *B29C 2035/0283* (2013.01); *B32B 2250/02* (2013.01);
(Continued)

(58) Field of Classification Search
None
See application file for complete search history.

(56) References Cited

U.S. PATENT DOCUMENTS

| RE27,973 | E | * | 4/1974 | Pennington et al. | B29C 53/845 |
| | | | | | 156/169 |
| 4,029,845 | A | * | 6/1977 | Nomura | H01B 5/14 |
| | | | | | 156/230 |

(Continued)

FOREIGN PATENT DOCUMENTS

| GB | 1083307 A | 9/1967 |
| JP | 55-67413 A * | 5/1980 |

(Continued)

OTHER PUBLICATIONS

Machine Translation of Japanese Patent 58-11142, Date Unknown.*

(Continued)

*Primary Examiner* — Jeffry H Aftergut
(74) *Attorney, Agent, or Firm* — Donna P. Suchy

(57) ABSTRACT

A method for curing a composite panel, including the steps of inserting a Biaxially Oriented Polypropylene release film into a mold, and curing the panel using a cold-in/cold-out process at a lowermost temperature within the panel's temperature curing range. The process further includes the use of a twice smoothed caul sheet, where the smoothing includes a coarse sanding and a fine sanding.

20 Claims, 1 Drawing Sheet

(51) Int. Cl.
  *B32B 37/18* (2006.01)
  *B32B 27/38* (2006.01)
  *B32B 27/34* (2006.01)
  *B32B 27/28* (2006.01)
  *B32B 27/36* (2006.01)
  *B32B 27/30* (2006.01)
  *B32B 17/06* (2006.01)
  *B32B 9/00* (2006.01)
  *B32B 27/06* (2006.01)
  *B29C 35/02* (2006.01)
  *B29C 37/00* (2006.01)
  *B29D 99/00* (2010.01)

(52) U.S. Cl.
  CPC ....... *B32B 2305/72* (2013.01); *B32B 2307/70* (2013.01); *B32B 2309/025* (2013.01); *B32B 2315/02* (2013.01); *B32B 2315/08* (2013.01); *B32B 2331/00* (2013.01); *B32B 2363/00* (2013.01); *B32B 2367/00* (2013.01); *B32B 2377/00* (2013.01); *B32B 2379/00* (2013.01)

(56) References Cited

U.S. PATENT DOCUMENTS

| | | | |
|---|---|---|---|
| 4,846,908 A * | 7/1989 | Aldrich | B29C 33/485 156/148 |
| 4,925,728 A * | 5/1990 | Crass | B29C 33/68 264/176.1 |
| 5,492,722 A * | 2/1996 | Tait | B29B 15/122 427/211 |
| 5,830,548 A | 11/1998 | Andersen et al. | |
| 6,270,603 B1 * | 8/2001 | Westerman | B29C 35/02 156/323 |
| 7,186,310 B2 | 3/2007 | Yamaguchi et al. | |
| 8,435,370 B2 * | 5/2013 | Kruger | B29C 70/226 156/148 |
| 8,647,548 B1 * | 2/2014 | Humfeld | C08J 3/20 264/137 |
| 2002/0146954 A1 * | 10/2002 | Drees | B44C 3/02 442/290 |
| 2005/0069712 A1 | 3/2005 | Strait | |
| 2012/0177877 A1 * | 7/2012 | Lebail | B29C 44/1228 428/116 |

FOREIGN PATENT DOCUMENTS

JP  58-11142 A  *  1/1983
JP  2-88227 A  *  3/1990

OTHER PUBLICATIONS

Machine Translation of Japanese Patent 55-67413, Date Unknown.*
Machine translation of Japanese Patent 2-88227, date unknown.*
International Search Report, 3 pages, dated May 13, 2015 from PCT/US2015/017856.

* cited by examiner

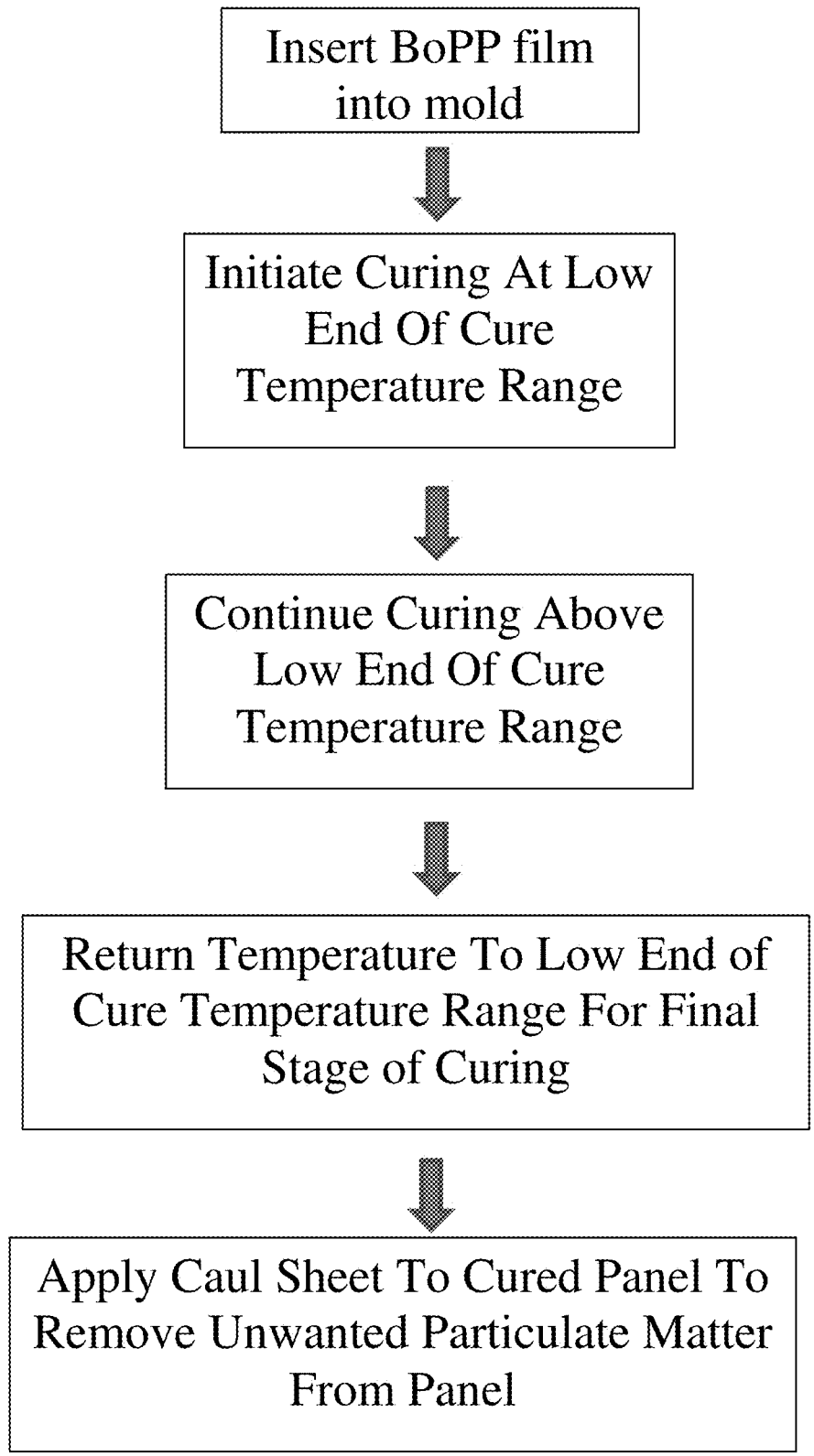

HONEYCOMB SANDWICH PANEL PAINT READY SURFACE

CROSS-REFERENCES TO RELATED APPLICATIONS

This application is based upon and claims priority from U.S. Provisional Application No. 61/945,330, filed Feb. 27, 2014, incorporated by reference in its entirety.

BACKGROUND

The present invention relates to a method for processing phenolic and epoxy resin prepreg honeycomb sandwich panels to achieve a smoother, more paint-ready surface post-production. Prepreg is a common term for fabric reinforcement that has been pre-impregnated with a resin system. The resin system is typically an epoxy that already includes the proper curing agent. As a result, the fabric is ready to lay into a mold without the addition of additional resin and without the steps required of a typical hand lay-up. These pre-impregnated composite fabrics and tapes, or "prepregs," are used in a large number of applications. For example, composite sandwich panels formed of reinforcing fibers and a matrix resin are widely used for aircraft, automobiles and other industrial applications because of their strength and weight characteristics. The details of the process by which these panels can be formed is described generally in U.S. Pat. No. 7,186,310 entitled Method For Forming A Honeycomb Composite Sandwich Panel, the contents of which are fully incorporated herein by reference. Advances in the science of sandwich panels have led to greater mechanical properties and the continuing search for more efficient manufacturing techniques. One constant goal is to limit and decrease the amount of surface defects, such as pocks, voids, and creases, which lead to both mechanical defects as well as costly post-production operations.

Especially for structural materials and interior materials of aircraft, reinforced fiber composite materials are increasingly used as skin panels in honeycomb sandwich panels for reduction of weight. Honeycomb cores used include aramid honeycomb cores and aluminum honeycomb cores. It is generally practiced to produce a honeycomb sandwich panel by laminating a honeycomb core made of aramid paper with prepreg laminates on both sides and curing the prepreg laminates while bonding the prepreg laminates to the honeycomb core as so-called co-curing. In this case, the adhesive strength between the honeycomb core and the prepreg laminates as skin panels is important, and a method of keeping adhesive films between the honeycomb core and the prepreg laminates and curing the prepreg laminates together with the adhesive films for fabricating a sandwich panel has been popularly used.

Furthermore, to decrease surface defects such as pits and resin blurs on the panel's skins, it has been often practiced to stick adhesive films on the surfaces of prepreg laminates, to allow them to cure together with the prepreg laminates. However, to advance weight reduction, and reduce material and fabrication costs, it would be desirable to form smooth skin panels free from surface defects without using any adhesive film.

In typical manufacturing operations for aerospace applications, the panels are manufactured and then there is a fill and fare operation prior to painting the panel where all of the defects are addressed. That is, the manufacturing process produces a panel surface that contains inherent and unacceptable defects such as pitting and telegraphing. Pitting leaves very small pinholes in the surface of a panel that must be filled prior to any painting. Telegraphing is a result of the facing material drooping into the empty area of the honeycomb core. This produces a surface that is not perfectly flat and can be observed after the painting process unless further remediation is performed on the finished panel. To eliminate these defects, the "fill and fare" operation is undertaken where the defects are cured.

The first remedial operation that typically occurs is a fill and sand step, where putty material is spread onto the surface to fill in the gaps, pits, and holes. There is significant labor in this step, which adds costs to the panel, and adds a slight weight increase as well due to the added weight of the putty material. Alternatively, surface films can be added to provide smooth surface to the panel. However, there is increased material costs associated with surfacing films that add weight to the panel as well as labor costs needed to apply the film. In some cases, "peel ply" materials are used, which also add weight and time to the manufacturing process.

All three of these remedial steps use expendable release materials to process the panels. These fill and fare operations are both time consuming and costly, and adds significantly to the manufacturing costs of the panels. It would be desirable to eliminate or significantly reduce the amount of fill and fare procedures prior to painting. The present invention addresses this need. By altering the choice of release materials and processing parameters to achieve the desired smooth surface, the present invention eliminates or reduces the amount of extra labor and material costs of the panel than would otherwise exist. The present invention adds the significant benefit of also adding no additional weight to the panel.

SUMMARY OF THE INVENTION

The present invention is a process for manufacturing a phenolic or epoxy resin prepreg honeycomb sandwich panel having a smooth, pit-free surface that is ready for painting with minimal fill and fare processing. The process of the present invention is a low cost procedure that does not require any additional materials in the panel to carry out the manufacturing operation, such as a peel ply or surfacing film. Rather, the surface of the panel of the present invention is achieved with the use of expendable materials and processing techniques.

The present invention involves up to three processing steps that produce a panel with a smooth, defect-free surface on a paint ready composite honeycomb core panel. The first step is the use of a release material such as a bi-axially oriented polypropylene film (BoPP), which provides a smooth/glossy surface. The BoPP material does not compact/soften like typical release materials, and therefore minimizes core telegraphing in the finished panel. In the second step, to prevent pitting and dimpling of the skin surface it is necessary to process the panel in-cold/out-cold at the low end of the materials cure temperature range. This prevents thermal shock to the panel that causes VOCs to release, causing small pits in the surface. Third, a pristine caul sheet surface is used so that no imperfections are transferred from the sheet to the panel. Caul sheets are prepared by sanding using 100 grit sandpaper to smooth the sheet and remove any large scratches, resin buildup, or any other unevenness. This is followed by another sanding operation using 320 grit sandpaper to further smooth out the caul sheet. After the secondary sanding, the caul sheet is wiped clean with solvent before application to the panel.

BRIEF DESCRIPTION OF THE DRAWING

FIG. 1 is a flow chart of steps used to prepare a composite panel according to the present invention.

DETAILED DESCRIPTION OF THE PREFERRED EMBODIMENTS

The method of the present invention provides a smoother, reduced defect surface for a composite panel, thereby limiting the post-curing processing prior to painting the panel. For purposes of this disclosure, the term "prepreg" refers to a reinforced material pre-impregnated with a polymer or resin matrix in a controlled ratio. Polymer matrices can be both thermoplastic and thermosetting. In a composite, the matrix supports and bonds the fibers, transferring applied loads and protecting the fibers from damage. Types of matrices include epoxy, phenolic, bismaleimide, cyanate ester, polyester, and vinyl ester. The most common types of fiber is glass, carbon, and aramid, although other fibers are used for special applications. The fabrics can be woven into various weaves, such as a plain weave, a twill weave, and a satin weave.

There are two main types of manufacturing methods for producing the prepregs; hot melt and solvent dip. Hot melting is conducted in two stages, where in the first stage the heated resin is coated onto a paper substrate in a thin film and in the second stage the reinforcement fibers and the resin film are brought together. Rollers may be used to apply pressure to implant the fibers in the resin using heat and pressure. In a solvent dip, resin is dissolved in a bath of solvent and reinforcing fabric is dipped into the resin solution. The solvent is then evaporated from the prepreg in an oven. In both manufacturing methods, a release film or material is typically used to separate the prepreg from the molds, tools, etc.

In the present invention, the release film is made from Biaxially Oriented Polypropylene film (BoPP). BoPP is a material with good clarity, resistance to UV light, excellent chemical and abrasion resistance, and most notably an ultra-smooth surface. It also has reasonable scuff resistance and yet is softer and more flexible than polyester or other similar films. When used as a release film in the manufacture of a prepreg panel, the BoPP does not compress like typical release papers, and therefore minimizes core telegraphing in the finished panel. Such biaxially oriented films are available, for example, from ViAm Films of Morristown, Tenn.

To prevent pitting and dimpling of the panel's skin surface, it is advantageous to thermally process the panel such that the initial and final stages of the curing process is conducted cold. That is, an "in-cold/out-cold" process is used where temperatures are maintained at the low end of the material's cure temperature range. This thermal process prevents any thermal shock to the panel during the curing, which may lead to VOCs being rapidly released at the surface of the panel. The rapid release of the VOCs result in bubbles, which in turn lead to small pits and cavities in the surface of the panel which must be repaired prior to painting. By ensuring that the panel is cured at the low end of the temperature range, thermal shock is avoided and pitting is minimized.

To further ensure a smooth and uninterrupted panel surface, a caul sheet is typically used. Caul sheets are used to locally reduce or intensify the pressure exerted on the composite laminates during an autoclave process. They are often introduced into the process at the final stage to address manufacturing problems that have occurred in production. There are multitudes of caul geometries and caul materials used in the industry, often quite different, but intended to yield a well consolidated laminate, free of voids and with uniform thickness. As part of the present invention, a caul sheet is used having a pristine surface formed by two sanding operations prior to use. The sanding process removes any scratches, resin buildup, or uneven surfaces in the caul sheet. This sanding process is initiated with a first sanding stage using 100 grit paper, for example, followed by a second sanding operation using 320 grit sandpaper to smooth out the caul sheet to a fine, even surface. Once the caul sheet application is complete, the smoothed surface is wiped with a solvent prior to use to remove any particulate and dust from the surface.

The foregoing steps yield a honeycomb sandwich panel with a paint ready surface, eliminating the fill and fare operation prior to painting. This improvement can save costs associated with the post-production processing and speed delivery of the components to the customer.

We claim:

1. A method for curing a composite panel, comprising:
placing a release film onto a mold;
laying up the composite panel on the release film on the mold;
initiating curing of the composite panel within the mold at a first curing temperature within a lowermost ten percent of a cure temperature range of a material of the composite panel;
maintaining, as a first curing stage, curing of the composite panel within the mold at the first curing temperature;
continuing curing of the composite panel within the mold at a second curing temperature above the lowermost ten percent of the cure temperature range;
maintaining, as a second curing stage, curing of the composite panel within the mold at the second curing temperature;
completing curing of the composite panel within the mold at a third curing temperature within the lowermost ten percent of the cure temperature range; and
maintaining, as a third curing stage, curing of the composite panel within the mold at the third curing temperature.

2. The method of claim 1, wherein the composite panel includes a thermosetting polymer matrix.

3. The method of claim 1, wherein the composite panel includes an epoxy matrix.

4. The method of claim 1, wherein the composite panel includes a phenolic matrix.

5. The method of claim 1, wherein the composite panel includes a bismaleimide matrix.

6. The method of claim 1, wherein the composite panel includes a cyanate ester matrix.

7. The method of claim 1, wherein the composite panel includes a polyester matrix.

8. The method of claim 1, wherein the composite panel includes a vinyl ester matrix.

9. The method of claim 1, wherein the composite panel includes a glass fiber.

10. The method of claim 1, wherein the composite panel includes a carbon fiber prepeg.

11. The method of claim 1, wherein the composite panel includes an aramid fiber core.

12. The method of claim 1, wherein the release film is a biaxially oriented polypropylene release film.

13. The method of claim 1, wherein the resultant composite panel is paint ready without need for fill and fare.

14. The method of claim 1, wherein the release film exhibits reduced compression in view of conventional release films, thereby minimizing core telegraphing in the composite panel upon curing.

15. The method of claim 1, wherein the composite panel is configured for use as an aircraft interior panel.

16. The method of claim 1, wherein the composite panel is configured for use as an aircraft structural panel.

17. The method of claim 1, wherein laying up the composite panel comprises placing a prepeg and a core onto the mold.

18. The method of claim 17, wherein the core is a honeycomb core.

19. The method of claim 17, wherein the prepeg is an epoxy resin prepeg.

20. The method of claim 1, wherein the resultant composite panel is paint ready without need for a surfacing film.

* * * * *